(12) United States Patent
Nedachi

(10) Patent No.: US 7,378,877 B2
(45) Date of Patent: May 27, 2008

(54) OUTPUT BUFFER CIRCUIT

(75) Inventor: Takaaki Nedachi, Tokyo (JP)

(73) Assignee: Nec Corporation, Tokyo (JP)

( * ) Notice: Subject to any disclaimer, the term of this patent is extended or adjusted under 35 U.S.C. 154(b) by 55 days.

(21) Appl. No.: 11/390,134

(22) Filed: Mar. 28, 2006

(65) Prior Publication Data
US 2006/0214691 A1 Sep. 28, 2006

(30) Foreign Application Priority Data
Mar. 28, 2005 (JP) .............................. 2005-092219

(51) Int. Cl.
*H03K 19/094* (2006.01)
(52) U.S. Cl. ......................................... 326/82; 326/86
(58) Field of Classification Search ................ 326/82, 326/83, 86; 327/108, 109
See application file for complete search history.

(56) References Cited

U.S. PATENT DOCUMENTS

| 6,772,250 | B2 * | 8/2004 | Dreps et al. ................. 710/100 |
| 7,112,989 | B2 * | 9/2006 | Ooshita et al. ............... 326/27 |
| 2002/0030517 | A1 * | 3/2002 | Kurisu et al. ................ 327/108 |
| 2002/0118042 | A1 * | 8/2002 | Helt et al. ...................... 326/86 |
| 2003/0193351 | A1 * | 10/2003 | Fukui ........................... 326/83 |

FOREIGN PATENT DOCUMENTS

| JP | 2000-68816 | 3/2000 |
| JP | 2002-94365 | 3/2002 |

* cited by examiner

*Primary Examiner*—Vibol Tan
*Assistant Examiner*—Thienvu V Tran
(74) *Attorney, Agent, or Firm*—Young & Thompson

(57) ABSTRACT

An output buffer with a pre-emphasis function to deliver a logic signal to a transmission line as a distributed constant circuit includes a first buffer to receive a first signal assigning a logical value to a logic signal to thereby drive the transmission line, a second buffer to receive a second signal having a predetermined logical relationship with the first signal to thereby drive the line in cooperation with the first buffer, and a unit to detect a change in the logical value of the logic signal. The second buffer is higher in output impedance than the first buffer on condition that attenuation of a signal through the line is reduced. If a de-emphasis state continues, a data generator creates a control signal such that the second buffer cooperates with the first buffer to drive the transmission line. The output buffer circuits therefore operate with low power consumption even if the de-emphasis state continues.

15 Claims, 7 Drawing Sheets

FIG. 3

| | | | | | | | | | | | | | | | | | | | | | | | | |
|---|---|---|---|---|---|---|---|---|---|---|---|---|---|---|---|---|---|---|---|---|---|---|---|---|
| DIN (Da) | 0 | 1 | 0 | 1 | 1 | 1 | 1 | 1 | 1 | 1 | 1 | 1 | 0 | 0 | 0 | 0 | 0 | 1 | 0 | 1 | 1 | 1 | X | X |
| Db | X | 0 | 1 | 0 | 1 | 1 | 1 | 1 | 1 | 1 | 1 | 1 | 1 | 0 | 0 | 0 | 0 | 0 | 1 | 0 | 1 | 1 | 1 | X |
| Dc | X | X | 0 | 1 | 0 | 1 | 1 | 1 | 1 | 1 | 1 | 1 | 1 | 1 | 0 | 0 | 0 | 0 | 0 | 1 | 0 | 1 | 1 | 1 |
| De | X | X | 1 | 0 | 1 | 0 | 0 | 0 | 0 | 0 | 0 | 0 | 0 | 0 | 1 | 1 | 1 | 1 | 1 | 0 | 1 | 0 | 0 | 0 |
| Dd (Sel) | X | X | 1 | 1 | 1 | 0 | 0 | 0 | 0 | 0 | 0 | 0 | 1 | 1 | 0 | 0 | 0 | 1 | 1 | 1 | 1 | 0 | X | X |
| Df | X | X | 1 | 0 | 1 | 1 | 1 | 1 | 1 | 1 | 1 | 1 | 0 | 0 | 0 | 0 | 0 | 1 | 1 | 0 | 1 | 1 | X | X |
| DOUTA (TA) | X | 0 | 1 | 0 | 1 | 1 | 1 | 1 | 1 | 1 | 1 | 1 | 1 | 0 | 0 | 0 | 0 | 0 | 1 | 0 | 1 | 1 | 1 | X |
| DOUTB (TB) | X | X | 1 | 0 | 1 | 1 | 1 | 1 | 1 | 1 | 1 | 1 | 1 | 0 | 0 | 0 | 0 | 1 | 1 | 0 | 1 | 1 | X | X |

OUTPUT BUFFER CIRCUIT

BACKGROUND OF THE INVENTION

1. Field of the Invention

The present invention relates to an output buffer circuit installed in a semiconductor integrated circuit device for converting logical information processed by the device into an appropriate logic signal to deliver the converted signal to an external unit, and in particular, to an output buffer circuit including a pre-emphasis function to appropriately emphasize a waveform on a transmission side in advance according to attenuation of a signal through a transmission line.

2. Description of the Related Art

It has been a common practice to employ a circuit including a pre-emphasis function as an output circuit, particularly, for long-distance, low-voltage, high-speed, i.e., high-frequency transmission.

The output buffer circuit of this kind generally includes a current-mode circuit handling a signal represented by a current, but it is not advantageous to operate the current-mode circuit with a low power-source voltage due to structure thereof.

However, the recent development of the fine machining technology for semiconductor integrated circuits has lowered the operation voltage required to operate the circuits and hence has reduced power consumption thereof. It is therefore required to operate the semiconductor integrated circuits at a higher speed with a lower power-source voltage.

The conventional techniques to meet the requirements include those described in Japanese Patent Application Laid-Open Ser. No. 2000-68816 entitled "Output Buffer Circuit for Transmitting Digital Signal via Pre-emphasis Transmission Line" and Japanese Patent Application Laid-Open Ser. No. 2002-94365 entitled "Output Buffer Circuit".

Particularly, the technique of Japanese Patent Application Laid-Open Ser. No. 2002-94365 drives an output circuit with a low power-source voltage and shortens a period of time of propagation delay from an input port to an output port to thereby implement a high-speed operation of the output circuit.

However, the invention of Japanese Patent Application Laid-Open Ser. No. 2002-94365 is attended with a problem that the consumption power increases when a de-emphasis state continues.

SUMMARY OF THE INVENTION

It is therefore an object of the present invention, which has been devised to remove the problem, to provide an output circuit operating with low power consumption even when the de-emphasis state continues.

In accordance with the present invention, there is provided an output buffer including a pre-emphasis function for delivering a logic signal to a transmission line operating as a distributed constant circuit. The output circuit includes a first buffer for receiving as an input thereto a first signal assigning a logical value to a logic signal and thereby driving the transmission line, a second buffer for receiving as an input thereto a second signal having a predetermined logical relationship with the first signal and thereby driving the transmission line in cooperation with the first buffer, and a unit for detecting a change in the logical value of the logic signal. In the output circuit, output impedance of the second buffer is set to be higher than output impedance of the first buffer on condition that attenuation of a signal through the transmission line is reduced. If a de-emphasis state continues, the second buffer operates in cooperation with the first buffer to drive the transmission line.

It is favorable in the configuration, that the first buffer includes a first flip-flop circuit which holds the first signal at a rising edge of a clock signal and which keeps holding the signal until a subsequent rising edge of a clock signal to thereby produce a first output signal therefrom. Additionally, the second signal is desirably the first output signal. Also, the second buffer favorably includes a second flip-flop circuit which holds the first output signal at a rising edge of a clock signal and which keeps holding the signal till a subsequent rising edge of a clock signal to thereby produce a second output signal and a reverse signal obtained by inverting the output signal, an EX-OR circuit for producing therefrom an exclusive logical sum of the first output signal, the second output signal, and the first signal; and a selector for receiving as inputs thereto the first and second output signals, delivering therefrom the first output signal if the EX-OR circuit produces an output value of "1", and delivering therefrom the second output signal if the EX-OR circuit produces an output value of "0".

In both configurations, it is desirable that the output buffer circuit further includes an output delay module for delaying an output signal from the first buffer for a predetermined period of time and an output signal from the second buffer for a predetermined period of time. In addition, the output delay module is desirably a buffer circuit or a data latch circuit.

In accordance with the present invention, there is provided an output buffer circuit capable of operating with low power consumption even when the de-emphasis state continues.

BRIEF DESCRIPTION OF THE DRAWINGS

The objects and features of the present invention will become more apparent from the consideration of the following detailed description taken in conjunction with the accompanying drawings in which:

FIG. 3 is a table showing changes in logical values of signals in the output buffer circuit;

DESCRIPTION OF THE EMBODIMENTS

In an output buffer circuit including a pre-emphasis function to emphasize a signal waveform according to attenuation of a signal through a transmission line for use in data transmission of, for example, an information processor, there are arranged a first buffer for receiving as an input thereto a first signal assigning a logical value to a logic signal and thereby driving the transmission line and a second buffer for receiving as an input thereto a second signal having a predetermined logical relationship with the first signal and thereby driving the transmission line in cooperation with the first buffer. In the output buffer circuit, output impedance of the second buffer is set to be higher than output impedance of the first buffer on condition that attenuation of a signal through the transmission line is reduced. If a de-emphasis state not emphasizing a waveform continues, the circuit detects that data change a little and changes the de-emphasis state consuming much power to the emphasis state less consuming power to thereby save the consumption power. Next, description will be given of an embodiment in accordance with the present invention.

First Embodiment

Description will now be given of a first embodiment of the present invention.

Figure 1:
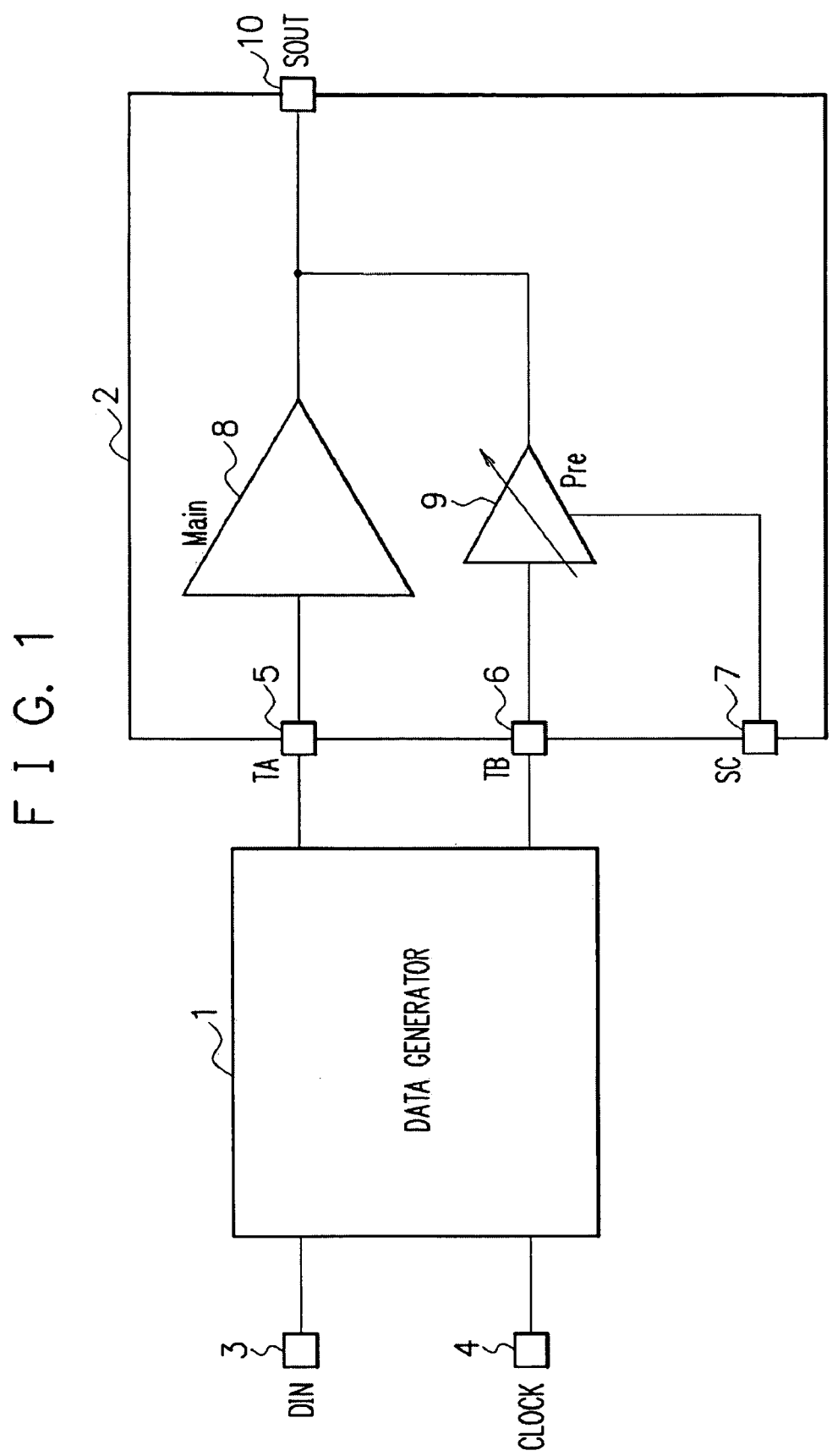
FIG. 1 is a schematic diagram showing a configuration of a first embodiment of an output buffer circuit.

FIG. 1 shows a configuration of the first embodiment of an output circuit. The circuit includes a data generator 1 and an output buffer unit 2. The output buffer 2 includes a current bit port or terminal 5, a reverse pre-bit port 6, a pre-emphasis control terminal 7, a main buffer 8, and a pre-buffer 9, and an output port 10. Since the output buffer 2 is effectively the same as that described in Japanese Patent Application Laid-Open Ser. No. 2002-94365, and hence description thereof will be avoided. The data generator 1 produces data to be fed to the output buffer 2.

Figure 2:
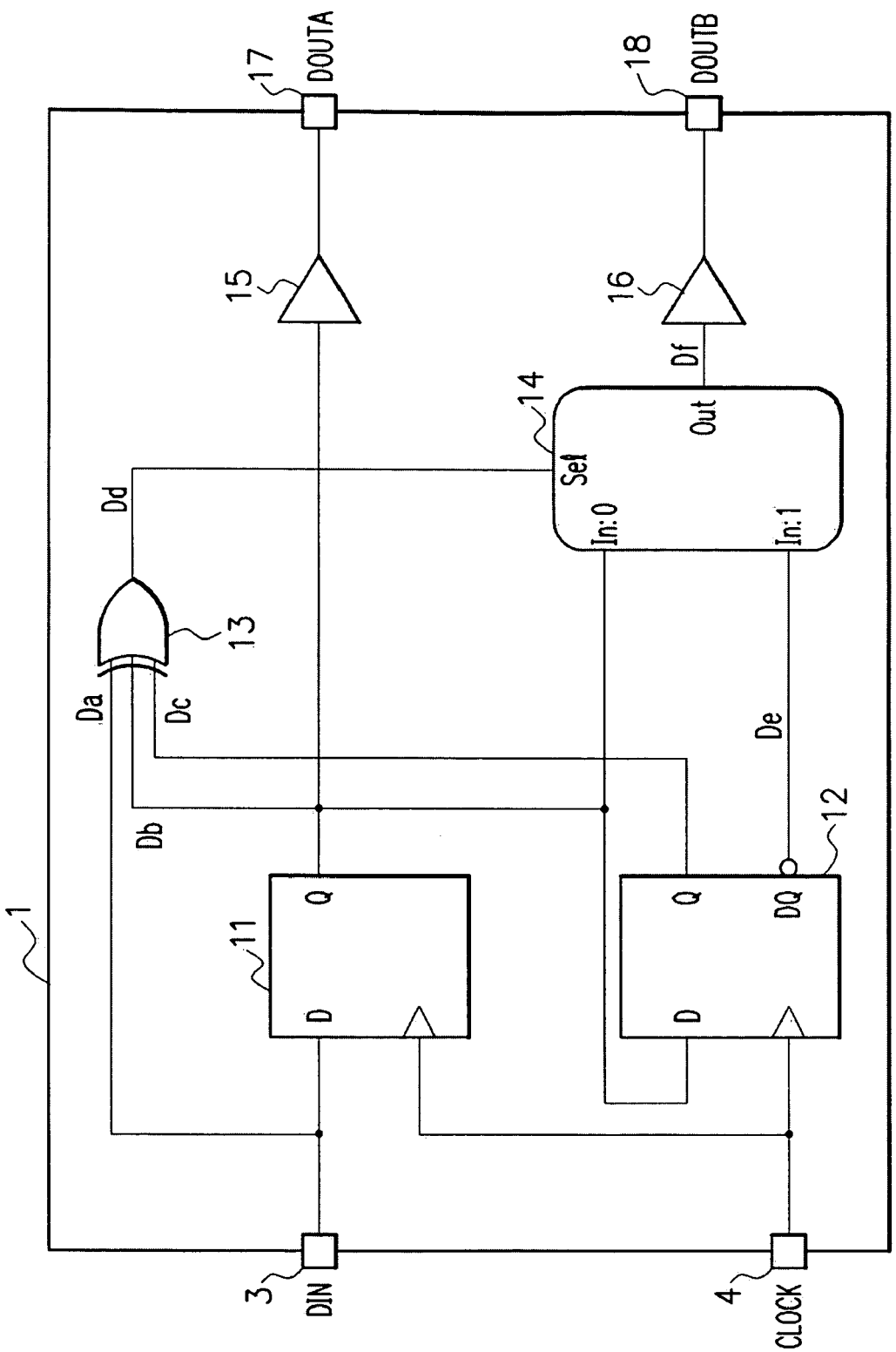
FIG. 2 is a diagram showing a configuration of a data generator unit in the first embodiment.

FIG. 2 shows structure of the data generator 1. The data generator 1 includes data latch circuits 11 and 12, an EX-OR circuit 13, a data path selector 14, and timing adjusting buffers 15 and 16. The data generator 1 also includes a data input port DIN 3, a clock input signal port CLOCK 4, a data output port DOUTA 17, and a data output port DOUTB 18. In the following description, DIN, CLOCK, and the like indicate not only the associated ports but also signals inputted to or outputted therefrom.

Each of the data latch circuits 11 and 12 is a general flip-flop circuit which holds input data at a rising edge of CLOCK. However, the latch 12 includes data output Q of data held therein and reverse output QB of data obtained by reversing the data output Q. The data path selector 14 is a general selector circuit which delivers, if sel is "1", data of port In (="1") to output port Out.

The timing adjusting buffers 15 and 16 are arranged to delay and to shape the waveform of output data signals DOUTA and DOUTB, respectively. However, in the circuit structure, the timing adjustment may be conducted using a data latch, not by a buffer.

Operation of the output buffer circuit will be described.

The data latch 11 attains input data DIN (da) at a rising edge of CLOCK and holds the data up to a subsequent rising edge of CLOCK. The latch 11 delivers a latch output "Db" via the buffer 15 to the output port DOUTA. The data latch 12 is an emphasis data generator circuit for the output buffer 2 following generator 1. The data latch 12 holds the output data Db and produces outputs including Dc and De obtained by reversing the output Dc. The EX-OR circuit 13 and the data selector circuit 14 constitute a circuit to detect a state of data. According to a result of the detection of the circuit, data to be delivered from DOUTB is determined. For example, for Da=Db=Dc=0 or 1, i.e., if the same logical value continues for three bits, Db is "0", and hence the input data Db to the selector 14 is selected. The data Db held by the data latch 11 is fed via the buffer 16 to the output port DOUTB. On the other hand, for other than Da=Db=Dc=0 and 1, Db is "1" and the reverse data with one-bit delay is obtained from the data latch 12 to be delivered via the buffer 16 to the output port DOUTB.

The output signal from DOUTB is delivered via the port TB to the output buffer 2. The signal determines whether or not an emphasis operation is to be conducted.

FIG. 3 shows a state change logic for the operation. In FIG. 3, however, for simplicity of explanation, delay in the selector 14 and delay in the buffers 15 and 16 are neglected. As can be seen from FIG. 3, the signal fed from the output port DOUTA is data obtained after holding DIN in the data latch 11 for a period of one bit. The signal from DOUTB is data obtained after holding DIN for one bit or reverse data attained after holding DIN for two bits according to a sequence of data items of DIN, Db, and Dc. The data produced by the data generator 1 of FIG. 2 is coupled with the output buffer 2 of FIG. 1. The data is finally delivered from an output port SOUT of the output buffer 2.

Figure 4A:
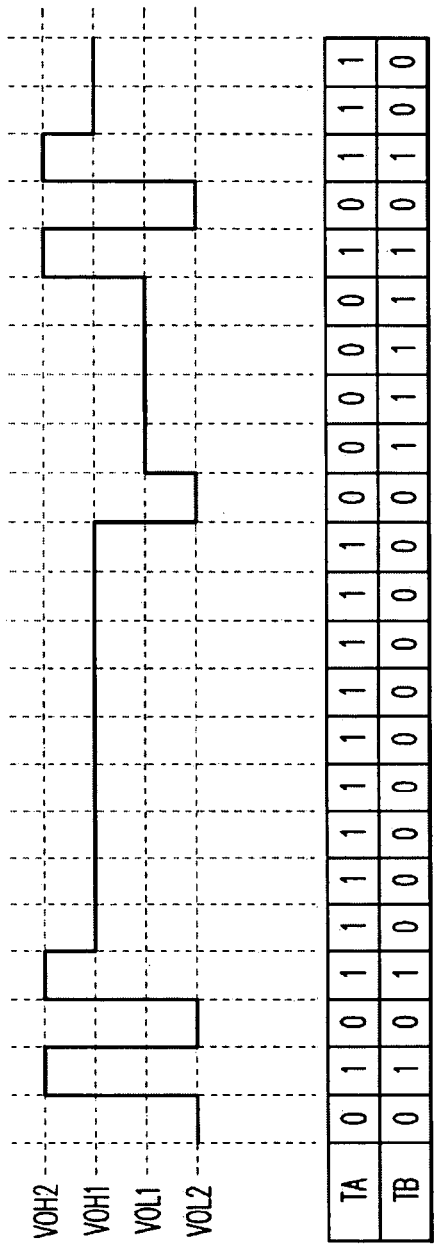
FIG. 4A is a graph showing a waveform of an output signal from the output buffer circuit.
Figure 4B:
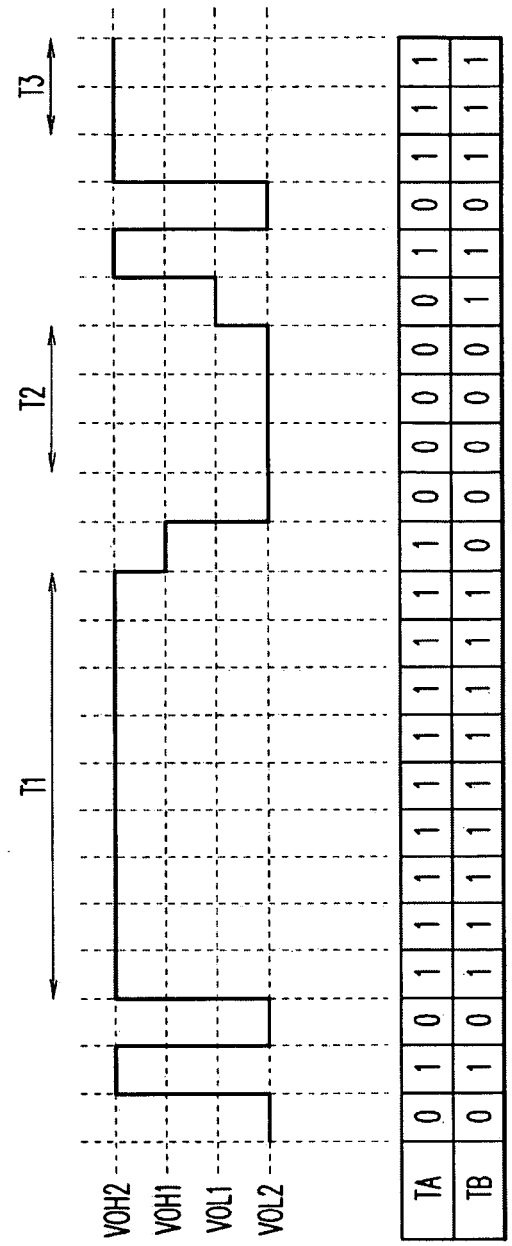
FIG. 4B is a graph showing a waveform of an output signal from an output buffer circuit of the prior art.

FIG. 4A shows a waveform of an output signals from the output buffer circuit of the embodiment. For comparison, FIG. 4B shows a waveform of an output signal from an output buffer circuit of the related art. As shown in FIG. 4A, the output buffer circuit of the embodiment keeps the emphasis state during the intervals of time T1, T2, and T3.

In this connection, output buffers possess a circuit characteristic as follows:

(Consumption power in de-emphasis state)>(Consumption power in emphasis state).

If data is fixed to "0" or "1", the consumption power increases.

Figure 5:
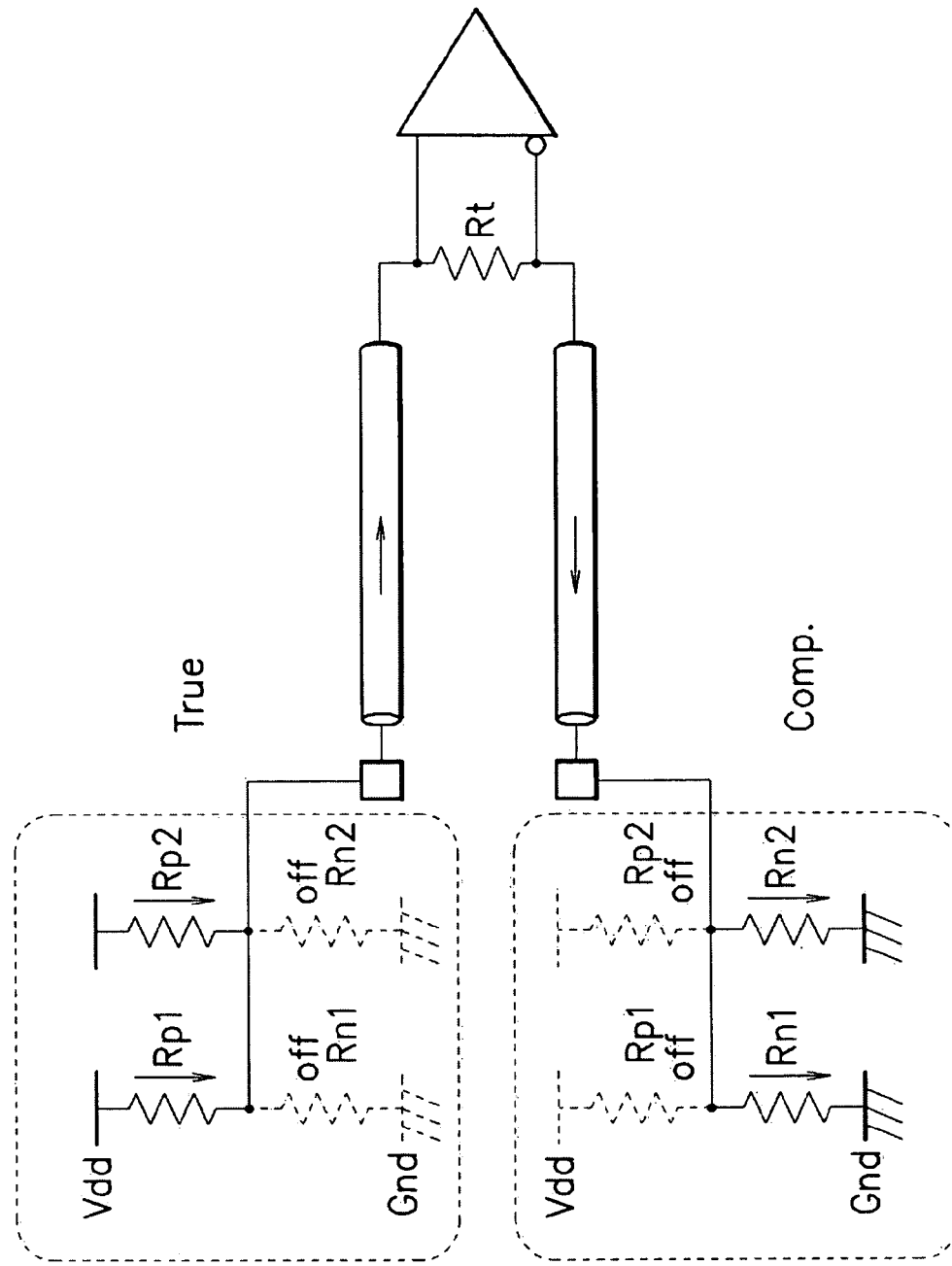
FIG. 5 is a diagram showing a flow of current in the output buffer in the emphasis state.

FIG. 5 shows a current flow in the output buffer in the emphasis state. Rp1 indicates p-channel transistor on-resistance of the main buffer, Rp2 is p-channel transistor on-resistance of the pre-buffer, Rn1 indicates n-channel transistor on-resistance of the main buffer, Rn2 designates n-channel transistor on-resistance of the pre-buffer, and Rt stands for termination resistance.

Assume that R1=Rp1=Rn1=20Ω, R2=Rp2=Rn2=100Ω, and Rt=100Ω. Then, combined resistance R0 is obtained as below.

$$R0=2(R1R2/(R1+R2))+Rt=133.3\Omega$$

Figure 6:
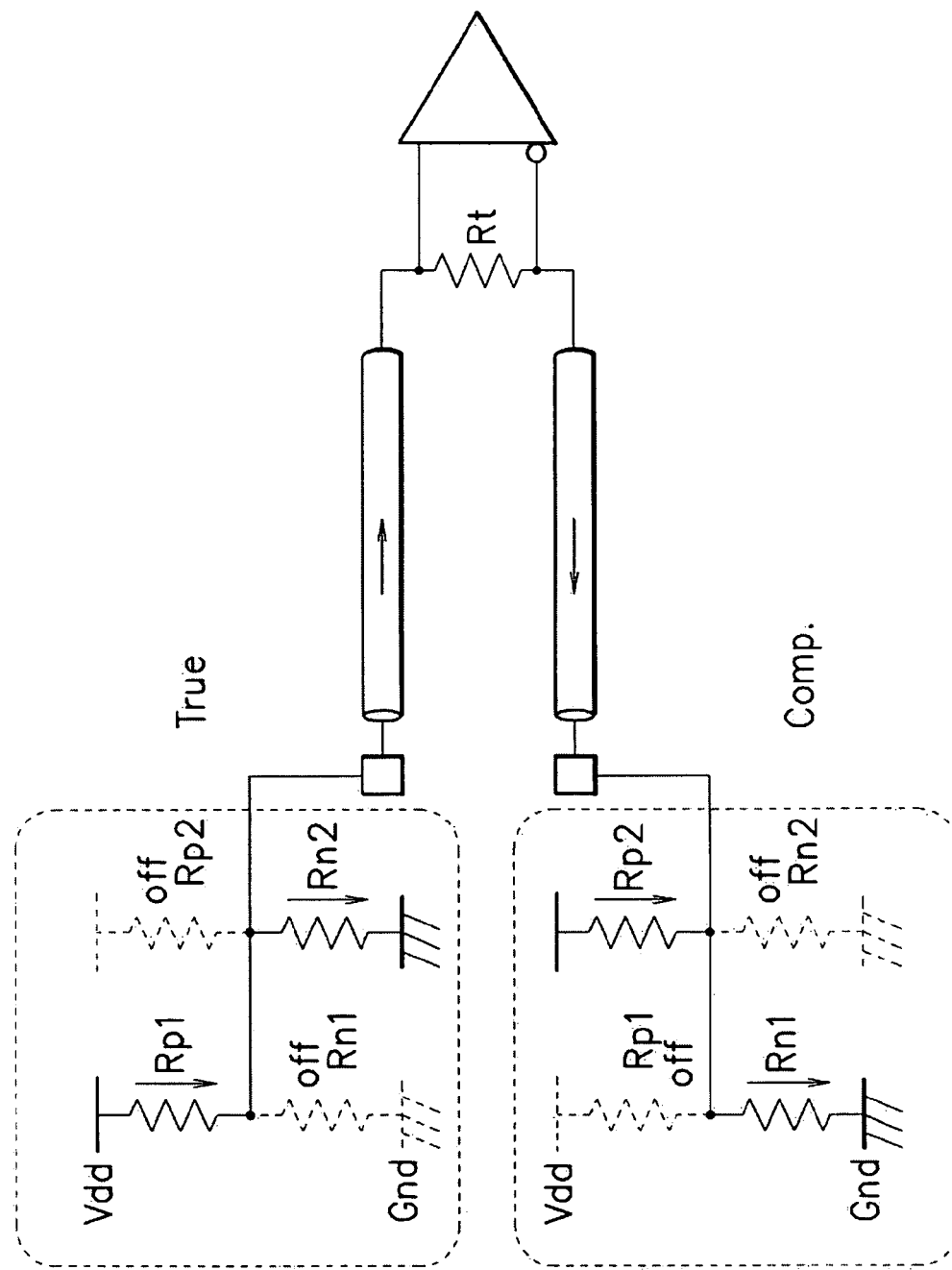
FIG. 6 is a diagram showing a flow of current in the output buffer in the de-emphasis state.

FIG. 6 shows a flow of a current in the output buffer in the de-emphasis state. Assume as in FIG. 4 that R1=Rp1=Rn1=20Ω, R2=Rp2=Rn2=100Ω, and Rt=100Ω. Then, the combined resistance R0 is attained as follows.

$$R0=(2R1R2(R1+R2)+Rt((R1+R2)^2))/((R1+R2+Rt)^2-Rt^2)=50\Omega$$

The combined resistance in the emphasis state considerably differs from that in the de-emphasis state. Specifically, the combined resistance in the emphasis state is 2.7 times larger than that in the de-emphasis state.

In the output buffer circuit of the first embodiment, if "0" or "1" continues in the output data DOUTA, the output data DOUTB is kept in the emphasis state associated with lower consumption power. In the example of FIG. 4, the consumption power is reduced during the intervals T1, T2, and T3 by keeping the emphasis state.

Due to the control operation, the consumption power can be saved when the data is fixed.

Second Embodiment

Figure 7:
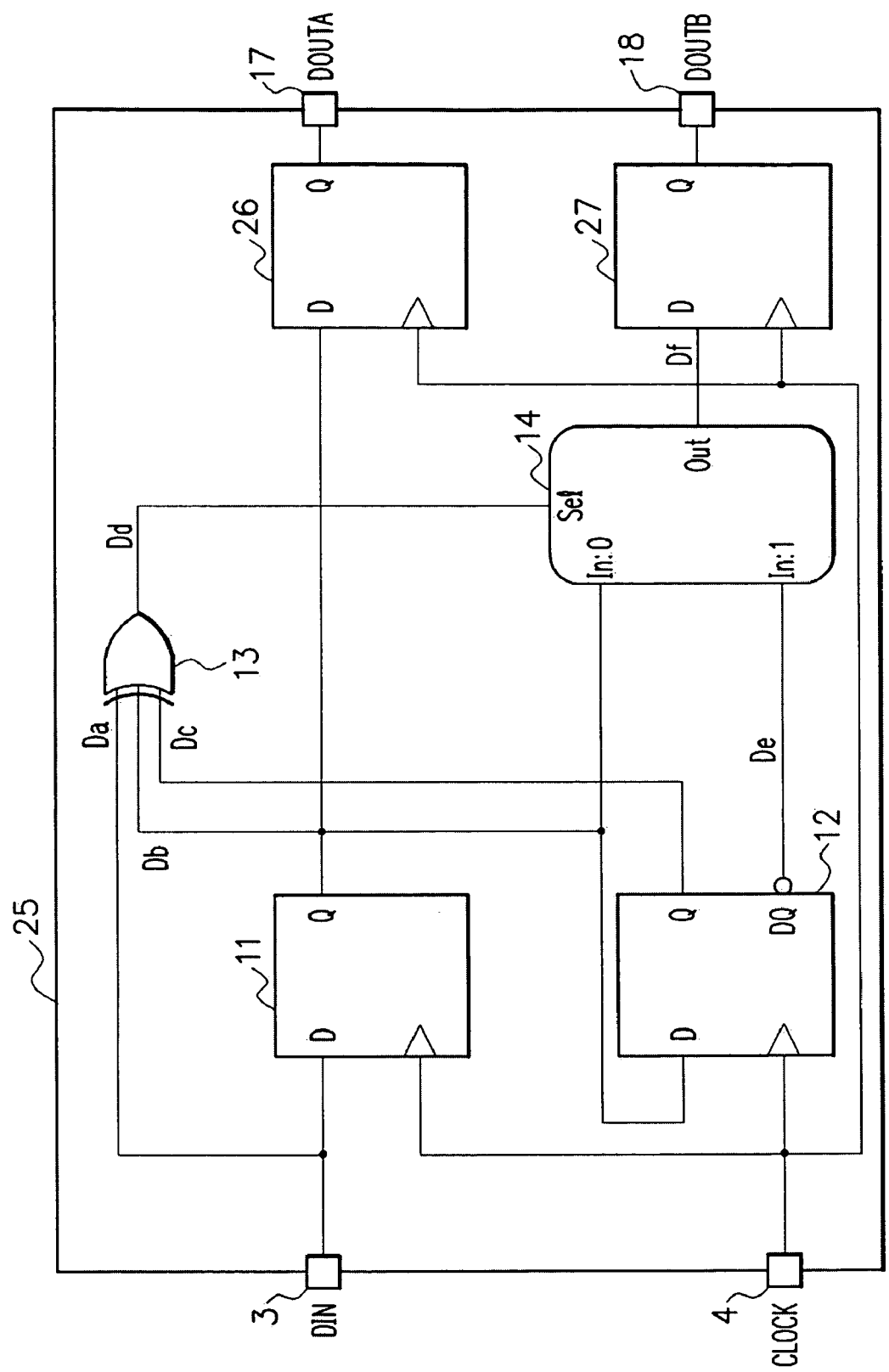
FIG. 7 is a diagram showing structure a data generator unit in a second embodiment.

Description will now be given of a second embodiment of the present invention. The output buffer circuit of the embodiment includes a data generator module and an output buffer section as in the first embodiment. FIG. 7 shows structure of the data generator 25 of the output buffer circuit. Although the generator 25 is substantially equal to that of the output buffer of the first embodiment, there are disposed data latch circuits 26 and 27 in place of the buffers 15 and 16. Operation of the data generator 25 is almost the same as that of the first embodiment, and hence description thereof will be avoided.

In the output buffer circuit of the second embodiment, the signals latched by the data latch circuits 11 and 12 are again latched by the data latches 26 and 27. Consequently, although latency of the overall circuit system is larger than that of the output buffer of the first embodiment, delay margin becomes larger. This facilitates the timing designing job and also increases the operation speed of the output buffer circuit.

The first and second embodiments are only favorable examples in accordance with the present invention. That is, the present invention is not restricted by the embodiments. That is, the embodiments can be modified and changed in various ways.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An output buffer including a pre-emphasis function for delivering a logic signal to a transmission line operating as a distributed constant circuit, comprising:
   a first buffer for receiving as an input thereto a first signal assigning a logical value to a logic signal and thereby driving the transmission line;
   a second buffer for receiving as an input thereto a second signal having a predetermined logical relationship with the first signal and thereby driving the transmission line in cooperation with the first buffer;
   output delay means for delaying an output signal from the first buffer for a predetermined period of time and an output signal from the second buffer for a predetermined period of time; and
   means for detecting a change in the logical value of the logic signal, wherein:
   output impedance of the second buffer is set to be higher than output impedance of the first buffer on condition that attenuation of a signal through the transmission line is reduced; and
   if a de-emphasis state continues, the second buffer operates in cooperation with the first buffer to drive the transmission line.

2. An output buffer circuit in accordance with claim 1, wherein the first buffer comprises a first flip-flop circuit which holds the first signal at a rising edge of a clock signal and which keeps holding the signal till a subsequent rising edge of a clock signal to thereby produce a first output signal therefrom.

3. An output buffer circuit in accordance with claim 2, wherein the second signal is the first output signal.

4. An output buffer circuit in accordance with claim 3, wherein the second buffer comprises:
   a second flip-flop circuit which holds the first output signal at a rising edge of a clock signal and which keeps holding the signal till a subsequent rising edge of a clock signal to thereby produce a second output signal and a reverse signal obtained by inverting the output signal;
   an EX-OR circuit for producing therefrom an exclusive logical sum of the first output signal, the second output signal, and the first signal; and
   a selector for receiving as inputs thereto the first and second output signals, delivering therefrom the first output signal if the EX-OR circuit produces an output value of "1", and delivering therefrom the second output signal if the EX-OR circuit produces an output value of "0".

5. An output buffer circuit in accordance with claim 1, wherein the output delay means is a buffer circuit.

6. An output buffer circuit in accordance with claim 2, wherein the output delay means is a buffer circuit.

7. An output buffer circuit in accordance with claim 3, wherein the output delay means is a buffer circuit.

8. An output buffer circuit in accordance with claim 4, wherein the output delay means is a buffer circuit.

9. An output buffer circuit in accordance with claim 1, wherein the output delay means is a data latch circuit.

10. An output buffer circuit in accordance with claim 2, wherein the output delay means is a data latch circuit.

11. An output buffer circuit in accordance with claim 3, wherein the output delay means is a data latch circuit.

12. An output buffer circuit in accordance with claim 4, wherein the output delay means is a data latch circuit.

13. An output buffer including a pre-emphasis function for delivering a logic signal to a transmission line operating as a distributed constant circuit, comprising:
    a first buffer for receiving as an input thereto a first signal assigning a logical value to a logic signal and thereby driving the transmission line;
    a second buffer for receiving as an input thereto a second signal having a predetermined logical relationship with the first signal and thereby driving the transmission line in cooperation with the first buffer; and
    means for detecting a change in the logical value of the logic signal, wherein:
    the first buffer comprises a first flip-flop circuit which holds the first signal at a rising edge of a clock signal and which keeps holding the signal till a subsequent rising edge of a clock signal to thereby produce a first output signal therefrom;
    output impedance of the second buffer is set to be higher than output impedance of the first buffer on condition that attenuation of a signal through the transmission line is reduced; and
    if a de-emphasis state continues, the second buffer operates in cooperation with the first buffer to drive the transmission line.

14. An output buffer circuit in accordance with claim 13, wherein the second signal is the first output signal.

15. An output buffer circuit in accordance with claim 14, wherein the second buffer comprises:
    a second flip-flop circuit which holds the first output signal at a rising edge of a clock signal and which keeps holding the signal till a subsequent rising edge of a clock signal to thereby produce a second output signal and a reverse signal obtained by inverting the output signal;
    an EX-OR circuit for producing therefrom an exclusive logical sum of the first output signal, the second output signal, and the first signal; and
    a selector for receiving as inputs thereto the first and second output signals, delivering therefrom the first output signal if the EX-OR circuit produces an output value of "1", and delivering therefrom the second output signal if the EX-OR circuit produces an output value of "0".

* * * * *